United States Patent [19]
Corti et al.

[11] Patent Number: 4,812,225
[45] Date of Patent: Mar. 14, 1989

[54] METHOD AND APPARATUS FOR TREATMENT OF OIL CONTAMINATED SLUDGE

[75] Inventors: Aldo Corti, Calgary, Canada; John A. Falcon, Milan, Italy

[73] Assignees: Gulf Canada Resources Limited; RTR Oil Sands (Alberta) Ltd., both of Calgary, Canada

[21] Appl. No.: 12,859

[22] Filed: Feb. 10, 1987

[51] Int. Cl.$^4$ .............................................. C10G 17/00
[52] U.S. Cl. ...................................... 208/13; 208/424; 208/425; 208/428; 210/708; 210/712; 210/729; 210/787; 210/804; 585/240
[58] Field of Search ................ 208/13, 424, 425, 428; 585/240; 210/708, 712, 729, 787, 804

[56] References Cited

U.S. PATENT DOCUMENTS

| | | | |
|---|---|---|---|
| 1,375,506 | 4/1921 | Gray | 208/13 |
| 1,525,016 | 2/1925 | Weir | 208/13 |
| 2,111,920 | 3/1938 | Wells | 208/13 |
| 3,140,257 | 7/1964 | Wilder, Jr. et al. | 210/708 |
| 3,692,668 | 9/1972 | McCoy et al. | 208/13 |
| 3,716,474 | 2/1973 | Hess et al. | 208/13 |
| 3,964,993 | 6/1976 | Romine | 208/13 |
| 4,260,489 | 4/1981 | Greig et al. | 208/13 |
| 4,264,453 | 4/1981 | Mraovich | 208/13 |
| 4,348,288 | 9/1982 | Yoshinaga et al. | 210/708 |
| 4,383,927 | 5/1983 | Srivatsu | 210/708 |
| 4,392,941 | 7/1983 | Roth et al. | 208/13 |
| 4,417,976 | 11/1983 | Sander et al. | 208/13 |
| 4,425,239 | 1/1984 | Jacocks et al. | 210/787 |

FOREIGN PATENT DOCUMENTS

| | | | |
|---|---|---|---|
| 1184865 | 4/1985 | Canada | 208/13 |
| 1110639 | 3/1980 | Japan | 208/13 |
| 1147106 | 4/1980 | Japan | 210/708 |

*Primary Examiner*—Curtis R. Davis
*Attorney, Agent, or Firm*—Bert J. Lewen; Henry Sternberg

[57] ABSTRACT

Oil containing sludges are treated for the recovery of oil therefrom to render the resultant sludge disposable, by a process of conditioning the sludge to destabilize the emulsified phase thereof, centrifuging the destabilized sludge to obtain a solids-rich material which is largely hydrocarbon free and disposable, and a supernatant, hydrocarbon-containing liquid, and then subjecting the supernatant so formed to liquid/liquid phase separation. The conditioning is conducted so as to prepare a conditioned sludge characterized by a solids content of less than 50% by weight, a water content of less than 90% by weight, an oil phase with an API gravity of less than 12°, a continuous aqueous phase, and the solids in the sludge being primarily water wetted, this conditioned sludge being ready for centrifugation.

24 Claims, 4 Drawing Sheets

METHOD AND APPARATUS FOR TREATMENT OF OIL CONTAMINATED SLUDGE

FIELD OF THE INVENTION

This invention relates to sludge treatment, and more particularly to the treatment of hydrocarbon oil-containing sludges for the recovery of hydrocarbons therefrom.

BACKGROUND OF THE INVENTION

Hydrocarbon oil-containing sludges of various types and consistencies are commonly produced in oil production and extraction processes, especially in the production of heavy oils and in the extraction of shale oils and oil sands when using aqueous extraction processes. They may also be produced as a result of hydrocarbon oil spillage onto soil etc.

A typical example of a hydrocarbon oil-containing sludge is that produced as a by-product of oil sands extraction. The heavy oil or bitumen from oil sands is commonly extracted using a hot water process. In situ techniques, including enhanced oil recovery, are now also being used to exploit oil sands deposits which are too deep to be economically mined. These in situ techniques commonly adopt steam flood, fire flood, carbon dioxide injection and oxygen injection. The production fluid recovered from the reservoirs is a mixture, usually a more or less tight emulsion, of water, solids and hydrocarbon. The product emulsion is broken by further treatment, e.g. in washtanks, settlers, heater treaters, electrostatic dehydrators and the like. From these treatments, there are recovered two streams, a useful hydrocarbon oil stream and the tailings. Tailings consist of water and solids contaminated with hydrocarbon. Normally, the tailings are collected into a pit or pond, in which the solids settle to the bottom and some water and hydrocarbon are recovered from the top. The settled solids form a sludge, which still contains a substantial amount of hydrocarbon and represents an environmental hazard. Disposal of the sludge presents economic and environmental difficulties. Adding to the disposal problem is the fact that the sludges are not stable over the long term.

SUMMARY OF THE INVENTION

It is an object of the present invention to provide a method for treating oil-contaminated sludge which is commercially practical.

It is a further object of the present invention to provide a method for treating oil-contaminated sludge in which a high proportion of the oil contained in the sludge may be recovered.

The process of the present invention treats such sludges by a series of steps, some of which are dependent on the predetermined characteristics of the sludge. Sludges of the above described type include the basic components of water, hydrocarbon oils of various consistencies, and solids of an inorganic and organic nature, along with other minor constituents. The relative proportions of the various components can vary over wide ranges. Even more importantly, however, the physico-chemical form of the sludge is variable and a successful sludge treatment process needs to take such variations into consideration and to be adaptable and versatile enough to handle them.

Thus according to the present invention, there is provided a process for treating an oil-containing sludge for recovery of oil therefrom, said sludge comprising an emulsion having a continuous liquid phase and a dispersed liquid phase of mutually immiscible liquids, one of said liquids being an aqueous liquid freely miscible with water and the other of said liquids being a hydrocarbon oil, either or both of said liquids containing dispersed solids, said process comprising the steps of:

(a) In a first, sludge-conditioning stage, adjusting the temperature of the sludge and mixing said sludge with at least one agent selected from water, hydrocarbon diluent and conditioning agents to destabilize the emulsified form thereof;

(b) In a second sludge-treatment stage, subjecting the so-conditioned sludge to centrifugation, to separate therefrom a solids-rich material of low hydrocarbon content and an aqueous centrifugate liquid of higher hydrocarbon content; and (c) In a liquid/liquid separation stage, causing the centrifugate to separate into an aqueous phase and a hydrocarbon phase.

DESCRIPTION OF THE PREFERRED EMBODIMENTS

The present invention requires a predetermination of the nature of the sludge which is to be treated, followed by an appropriate selection of conditioning agent or agents and diluent based upon that determination. These conditioning agents may include demulsifiers, wetting agents, and pH modifiers.

According to the preferred embodiment of the invention, after the nature of the sludge has been determined, suitable conditioning agents, diluent, if necessary, and a suitable amount of water are added thereto, and thoroughly mixed with the sludge so that its emulsified nature is effectively destabilized, in a first, sludge-conditioning stage. The resultant conditioned sludge is then separated by centrifugation, in a second, sludge treatment stage of the process, into a solid-rich cake with low hydrocarbon content and a liquid-rich stream containing the major portion of the hydrocarbon and the water from the original sludge. The solid cake is sufficiently low in hydrocarbon content that it can be discarded for disposal without substantial environmental risk. The liquid rich stream, ie. the centrifugate, proceeds to a third stage, of liquid/liquid separation, whereby the hydrocarbon values are recovered, and thence to a fourth, diluent recovery stage where the recovered hydrocarbon values are partially separated by distillation or flash evaporation, to provide a heavy oil stream and a lower boiling recyclable diluent stream for use in the conditioning stage of the process.

The best performance of the sludge treatment stage depends upon the choice of suitable centrifuge and suitable operating conditions, as well as upon the proper conditioning performed at the upstream sludge-conditioning stage.

It is important for proper conditioning to establish the characteristics of the oil-contaminated sludge to be treated. Five factors should preferably be considered: the nature of the continuous phase, the nature of the oil phase, the content of solids in the sludge, the pH of the sludge, and the distribution of the solids between the oil and aqueous phases.

The liquid components of the sludge, may have the physico-chemical form of an oil-in-water emulsion or a water-in-oil emulsion. In either case, the emulsion must be destabilized for effective separation to occur. If the liquid components of the sludge are in the form of an oil-in-water emulsion, the water is the continuous phase, and the hydrocarbon is present in droplets of various sizes. Most of the solids are in the water phase, and only some of them are coated with hydrocarbon. In this case, the addition of a diluent or of an oil soluble demulsifier alone will not be sufficient to achieve the adequate performance of the treatment. The system is more sensitive to modifiers of the aqueous phase than to modifiers of the hydrocarbon phase.

In an oil-in-water emulsion, suitable conditioning agents include pH modifiers and water-soluble demulsifiers. The pH modifiers are selected to bring the sludge to a pH level in which the demulsifier works effectively.

If the liquid components of the sludge are in the form of a water-in-oil emulsion, the hydrocarbon phase is the continuous phase, and the water is present in droplets of different sizes. The solids are generally inside the water droplets but are also present in the hydrocarbon phase, where they are coated with hydrocarbon. In this case, the system is more sensitive to modifiers of the hydrocarbon phase.

A suitable hydrocarbon soluble conditioning agent is a hydrocarbon soluble demulsifier such as those marketed under the trade names D-101, E-5-40 or RP329. For example D-101 has been found to be particularly effective when the aqueous phase is acidic, whilst E-5-40 is particularly effective when the aqueous phase is alkaline. RP 329, on the other hand has been found particularly effective in the treatment of heavy-oil contaminated sludges from the Wabasca area of North Alberta.

Another suitable conditioning agent is a solids wetting agent to modify the solid surfaces to increase their affinity for water. Solids wetting agents are pH dependent, so different agents will have to be tested to determine their effectiveness in a particular sludge. One type of solids wetting agent that may be suitable is marketed under the trade name DS-504.

The nature of the oil phase determines whether hydrocarbon oil diluent addition is required or not.

Hydrocarbon diluent addition to the sludge-conditioning stage is required when the API gravity of the oil contaminating the sludge is 14° or less. Diluent addition to the sludge-conditioning stage becomes unnecessary, or at least optional, when the API gravity of the oil-contaminating the sludge is 14° or higher.

The selection of the diluent has to meet a number of requirements. Diluent is added to the system to enhance the separation between solids and hydrocarbon, and between hydrocarbon and water. By way of example, the bitumen and the heavy oils recovered from the operations in Northern Alberta present a specific gravity very close to that of water, so that gravity separation between the two liquids is difficult. Thus, any hydrocarbon with a specific gravity less than 0.95 (more than 17.5° API) added to the sludge will produce a hydrocarbon phase capable of being separated from the aqueous phase in the liquid/liquid phase separation stage. Separation is especially facilitated when the specific gravity of the diluted oil stream is less than 0.9 (more than 25.7° API). Separation by distillation of the recovered diluted oil into the diluent stream and the heavy oil stream performed at the diluent recovery stage is facilitated if the diluent has a substantially different boiling range from that of the original oil, or if the diluent consists of one or more of the lower boiling compounds already present in the original bitumen or heavy oil which comtaminates the sludge.

The nature of the continuous phase and the total solids content of the sludge determine the need for water addition. If oil is the continuous phase, water addition is required to the conditioning stage in order that the feed to the sludge treatment stage should contain sufficient water adequately to displace the hydrocarbon from the solids. It is preferable that the feed to the sludge treatment stage contains not more than 90% by weight of water regardless of the nature of the continuous phase. For best results, the water content should be within 75–90%. In addition, it is preferable that the total solids content in the feed to the centrifugation step not exceed 50% by weight regardless of the nature of the continuous phase. For best results, the solids content should be within 10–25%. This criterion must also be considered in determining whether or not water addition is required at the conditioning stage.

The proportion of the total solids content of the sludge that is in the aqueous phase determines whether hydrocarbon diluent or water should be added first to the sludge. Where a significant proportion of the solids, that is say more than about 40%, is in the oil phase (be it the continuous phase or the dispersed phase), it is advantageous to add the oil soluble conditioning agent, and, where required, the diluent also, to the conditioning stage before adding the water. Where a significant proportion of the solids is in the water phase, on the other hand, it is better to add the water first.

The operating temperatures of the sludge-conditioning stage and the sludge treatment stage and the liquid/liquid phase separation stage have an effect on the efficiency of the process. The higher the operating temperature, the lower the viscosity of the sludge. The upper limit of the temperature is fixed by the choice of diluent and/or by the boiling point of the water at the operating pressure. If, as is desirable, the sludge-conditioning stage, the sludge treatment stage and liquid/liquid phase separation stage are operated at atmospheric pressure, the operating temperature must be below 100° C.

The sequence of addition of the conditioning agents may be important, as mentioned above. For example, with the sludge having a hydrocarbon continous phase, an API less than 14° and a high solids concentration, a sufficient amount of water is first added to the sludge to make the sludge sufficiently fluid for pumping and mixing. Subsequently, a suitable diluent is added. A hydrocarbon demulsifier and a wetting agent are then added. Finally, a suitable amount of water is added to displace the hydrocarbon from the solids and to ensure that the solids content and water content are within their preferred ranges. Generally, the steps to treat a water-in-oil sludge should follow the above sequence and if certain steps are not necessary, they can be omitted.

If, for example, a sludge having a continuous water phase, a high solids content and a discontinuous oil phase with an API gravity of less than 14° is treated, water is added first to obtain the preferred solids and water content mentioned above. Subsequently, a hydrocarbon diluent is added, followed by a pH modifier and a water soluble demulsifier. Generally, the steps used to treat an oil-in-water sludge should follow the above sequence and if certain steps are not necessary they can be omitted.

In some cases diluent addition is not required. Then the method of the invention comprises only a sludge-conditioning stage, a centrifugation stage and a liquid/-liquid phase separation stage.

For the centrifugation step, it is preferred to use a suitable solid bowl, scroll-type centrifuge. The conditioned sludge is best introduced into the centrifuge at a suitable point inside the machine so as to minimize the amount of hydrocarbon and moisture in the solid cake stream while recovering an almost solids free liquid phase. When employing a two-way centrifuge, this point of introduction is suitably near the halfway point along its longitudinal axis, but closest to the liquid discharge. In the alternative, when a solid bowl, scroll-type threeway centrifuge is used, the feed is delivered in the last half along its longitudinal axis, preferably in the last quarter, distant from the solid discharge.

It has been found that a scroll-type centrifuge is a suitable apparatus to perform what is required in the sludge treatment stage, provided that a number of requirements are met and a few modifications are made with respect to conventional design practice. The main objective of the treatment is to recover a treated sludge containing the least amount of hydrocarbon and moisture. Prior art uses of scroll-type centrifuges are mainly aimed towards obtaining a clear liquid phase. Therefore the normal setting and operating conditions of a scroll-type centrifuge may lead to wrong conclusions and to poor performance when applied to the process of the invention.

Separation of liquids and solids is enhanced by centrifugal force. In cases where only the liquid product characteristics are important, the centrifugal force can be limited to, for example, 1000 times the gravitational force to obtain good results. On the other hand, higher force is required to produce adequately hydrocarbon-free solids. In fact the difference in specific gravity between solids (predominantly quartz and clays) and liquid (water/oil) is high, and the viscosity, with suitable dilution and temperature control, can be kept low. Each individual solid particle travels from the point of introduction to the periphery of the machine through a liquid medium that becomes leaner in solids with time. Additional centrifugal force does not substantially change this condition. At the same time, the solids layer at the periphery becomes more and more compacted with residence time, and the releasing of the contaminating liquid through a solid matrix becomes more and more difficult. Additional centrifugal force assists this process, but has only marginal effect on the overall yield of recovered liquid.

Solid bowl scroll-type centrifuges are well established and reliable machines. It has now been discovered and forms part of this invention, that, to gain the advantage of using any of the well-known machines of this type only a proper balance between centrifugal force, thickness of compacted solids layer and solids residence time allows operation, in an economically viable and technically sound manner, for the purpose of treating oil-contaminated sludge. When the proper balance is used, a treated sludge containing the least amount of hydrocarbon and moisture is obtained.

To obtain a residual oil content in the treated sludge of less than 4% weight and a total solid content of more than 65% weight, a minimum centrifugal force of 2000 times the gravitational force is required, preferably more than 2500 times. For any given magnitude of centrifugal force, a proper combination of thickness of compacted solids layer and residence time is required. For example, with a centrifugal force of 2700 times the gravitational force, a solids layer thickness of 0.8 mm requires a solids residence time of at least about 3.5 seconds, while a solids layer thickness of 1.2 mm requires a solids residence time of at least about 6.5 seconds. By way of further example; with a centrifugal force of 2100 times the gravitational force, a solids layer thickness of 0.8 mm requires a solids residence time of at least about 10 seconds.

Generally, a residence time of 0.5 to 15 seconds requires a centrifugal force of between 2,000 to 3,500 times the gravitational force, and preferably the residence time is from 3 to 5 seconds and the centrifugal force is between 2,500 to 2,700 times the gravitational force.

Once the proper combination has been obtained between the centrifugal force, the thickness of the solids layer and the solids residence time, it is possible to select a centrifuge of the correct diameter, rotational speed, conveyor speed and length of the solids compaction zone.

It has now been discovered, that, in the centrifuging of properly conditioned oil containing sludge, the first separation of the solids from the liquid phases is quite easy, but the squeezing of the residual liquid out of the solids is the controlling step. It is thus deduced that the feed point inside the centrifuge must be in the half part of the machine towards the liquid outlet, preferably in the 25% part of the machine close to the liquid outlet.

BRIEF REFERENCE TO THE DRAWINGS

In the drawings, like reference numerals indicate like parts.

DETAILED DESCRIPTION OF SPECIFIC EMBODIMENTS

Figure 1:
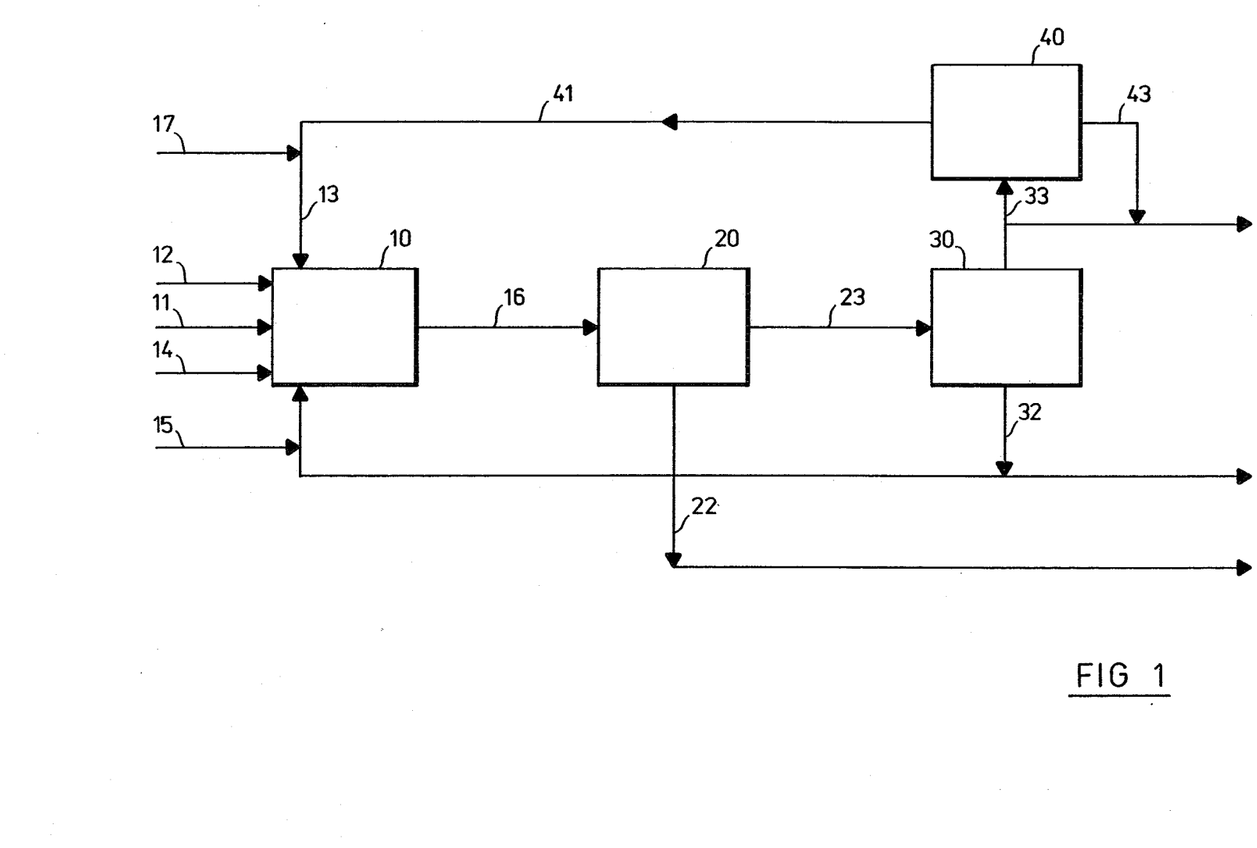
FIG. 1 is a block diagrammatic representation of a process according to the present invention.

With reference to FIG. 1 of the accompanying drawings, the process of the preferred embodiment of the invention comprises four treatment stages interconnected in sequence, and diagrammatically represented on FIG. 1 as a sludge-conditioning zone 10, a sludge treatment zone 20, a liquid/liquid phase separation zone 30 and a diluent recovery zone 40. Hydrocarbon containing sludge, e.g. such as produced in an in situ heavy oil facility, enters the sludge-conditioning zone 10 through line 11. Depending upon the nature of the sludge, it may be necessary to condition it by addition of diluent water, which can enter the sludge-conditioning zone 10 through line 15, or hydrocarbon diluent, which can enter the sludge-conditioning zone 10 through line 13. Additional inlet lines 12, 14 allow for addition of further conditioning agents to zone 10. Within zone 10, the sludge is mixed with the various additives to form a conditioned sludge, which then exits via line 16 to the next treatment stage, namely the sludge treatment zone 20.

In treatment zone 20, the conditioned sludge is separated into a solid-rich stream containing a small amount of residual hydrocarbon, which exits via line 22, and a liquid-rich stream, which contains most of the water and hydrocarbon from the conditioned sludge together with a very small amount of residual solids. The liquid-rich stream exits the treatment zone 20 via line 23, to the next treatment stage, namely the liquid/liquid phase separation zone 30.

In the phase separation zone 30, the liquid-rich stream separates into a first, hydrocarbon oil-containing stream and a second, water-rich stream which contains only traces of hydrocarbons. The first stream exits the separation zone 30 via line 33 to the diluent recovery zone 40. The second, aqueous stream exits via line 32 for partial recycle to the sludge-conditioning zone 10 if required. The diluent recovery zone 40 separates the first, hydrocarbon oil-rich stream into a light oil fraction, suitable for recycle as a hydrocarbon diluent to the sludge-conditioning zone 10 via line 41 if required, in admixture with hydrocarbon soluble conditioning agent added thereto via line 17, and a heavy oil fraction which exits via line 43.

Figure 2:
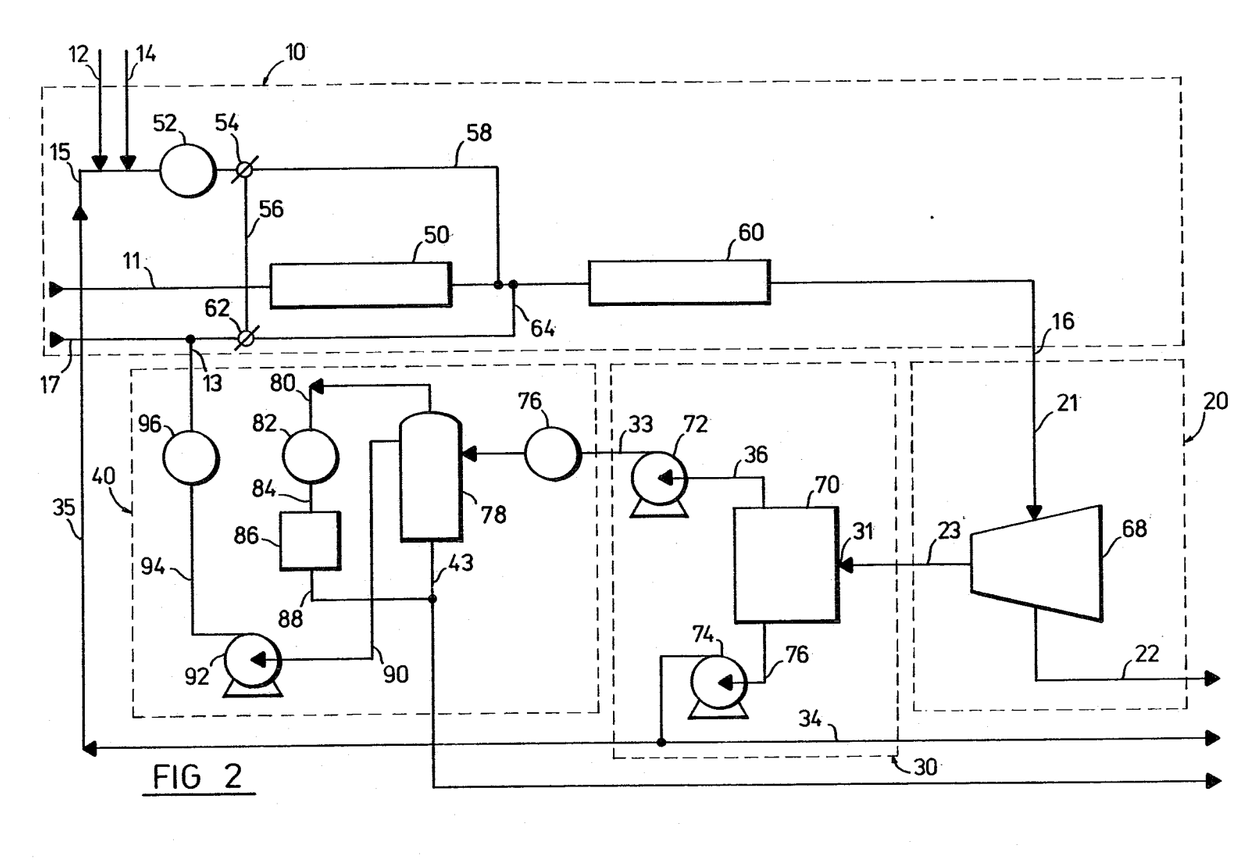
FIG. 2 is a more detailed diagrammatic illustration of the process of FIG. 1.

FIG. 2 of the accompanying drawings is a diagrammatic representation of the process of FIG. 1, in an expanded, more detailed format. The respective treatment stages are shown enclosed in broken line frames, the components of each stage being denoted within its respective frame. Thus, the hydrocarbon containing sludge for treatment enters sludge-conditioning zone 10 through line 11 into a mixing device 50, either an inline mixer or a stirred vessel. Prior to entering mixing device 50, various conditioning agents and diluents may be added to the sludge, the nature and amounts of which depend upon the results of prior analysis of the constitution and nature of the sludge. Thus, there is provided a heater-mixer vessel 52 to which may be supplied conditioning agents via lines 12 and 14, and recycled process water from line 15. Downstream of the vessel 52 is provided a two-way valve 54. The mixture of water and conditioning agents, adjusted in vessel 52 to an appropriate temperature, is directed to mix with the sludge in mixing device 50 via upstream line 56, or to encounter the mixture leaving mixing device 50 via downstream line 58. A second mixing device 60 is provided in series with device 50, and water and conditioning agents supplied via line 58 mix with the hydrocarbon containing sludge in mixing device 60.

Similarly, in sludge-conditioning zone 10, means are provided to mix the sludge for conditioning purposes with hydrocarbon soluble conditioning agents and hydrocarbon diluent, recycled from downstream sludge treatment operations. Thus, hydrocarbon soluble conditioning agent enters zone 10 via line 17 and mixes with reccled hydrocarbon diluent entering zone 10 via line 13. The mixture is controlled via two-way valve 62 to mix with the sludge in line 11 upstream of mixing device 50, or downstream thereof through line 64.

Thus, when the oil contaminated sludge has a continuous hydrocarbon phase, so that water is required as diluent to help break the emulsion, the operator may set valves 54 and 62 to supply only water and appropriate conditioning agents via line 56 to the sludge, for mixing therewith in mixing device 50. Hydrocarbon diluent and conditioning agents soluble therein may be added later, if desired, to the conditioned sludge for mixing therewith in second mixing device 60. When the sludge being processed contains a significant portion of its solids in the hydrocarbon phase, so that hydrocarbon treatment of the emulsion is desired initially, the valves 54 and 62 may be set to provide hydrocarbon and hydrocarbon-soluble conditioning agents to the sludge in line 11, for mixing in mixing device 50, and water diluent only added if desired via line 58, downstream of mixing device 50 but upstream of second mixing device 60. One stream only, the so-conditioned sludge, leaves the second mixing device 60 and the sludge-conditioning zone 10, through exit line 16, to enter sludge treatment zone 20.

The sludge treatment zone 20 contains a centrifuge 68, of the solid bowl, scroll-type. The conditioned sludge enters the centrifuge 68 through line 21, at a suitable point along its longitudinal axis as discussed above. Two streams leave the centrifuge 68, a liquid-rich stream via line 23 and a solid-rich cake via line 22. The solid-rich stream in line 22 contains most of the solids entering the sludge treatment zone 20 through line 21. It also contains a small part of hydrocarbon and some moisture. The majority of the hydocarbon and of the water that enter the sludge treatment zone 20 leave the centrifuge 68 and the sludge treatment zone 20 through line 23. This liquid-rich stream may also contain a small amount of solids which enter the sludge treatment zone 20 through 21. The solid-rich stream in line 22 represents the treated sludge, and is eliminated from the process for disposal. The liquid-rich stream leaving through line 23 enters the liquid/liquid phase separation zone 30, bounded on FIG. 2 in broken lines.

The liquid/liquid phase separation zone 30 comprises a liquid/liquid separator device 70 and two liquid pumps 72 and 74. The water/hydrocarbon liquid stream 31 is fed to the liquid/liquid separator device 70. This separator device may be a simple settler, a vessel containing packing to enhance coalescence, an inclined plate separator, a "raining bucket contactor" or other apparatus. The liquid/liquid separator 70 separates the inlet stream 31 into two outlet streams: an aqueous stream 76 and a hydrocarbon stream in line 36. The aqueous stream 76 is pumped by a pump 74 and is split into a first aqueous stream in line 34 and a second aqueous stream in line 35. The aqueous stream leaving the liquid/liquid phase separation stage 30 through line 35 is recycled back to the sludge-conditioning stage 10 through line 15. The aqueous stream leaving the liquid/liquid phase separation stage 30 through line 34 is the excess aqueous phase and leaves the process for disposal. The hydrocarbon phase leaving the liquid/liquid separator 70 through line 36 is pumped via pump 72 and leaves the liquid/liquid phase separation zone 30 through line 33.

The same stream enters the last process stage, the diluent recovery zone 40. This stream is first heated in heater 76 and then enters the distillation/stripping/flashing column 78. At the top of the column 78 a light hydrocarbon stream 80 is recovered in vapour phase, condensed in condenser 82 and collected through line 84 into an accumulator 86. The stream recovered via line 43 from the bottom of the column 78 as a liquid phase which represents the oil recovered from the treatment of the oil-contaminated sludge, leaves the diluent recovery zone 40 and the whole process, and is sent to sales tank or to join the other oil production facilities, in this way increasing the overall recovery. The liquid stream collected in the accumulator 86 represents the light ends. It is sent through line 88 to join the product stream 43. The recycled diluent stream 90 obtained from an intermediate stage of the column 78 is pumped by pump 92 through 94 and through a heat exchanger 96 and leaves the diluent recovery zone 40 to enter the sludge-conditioning stage 10 through 13.

Figure 3:
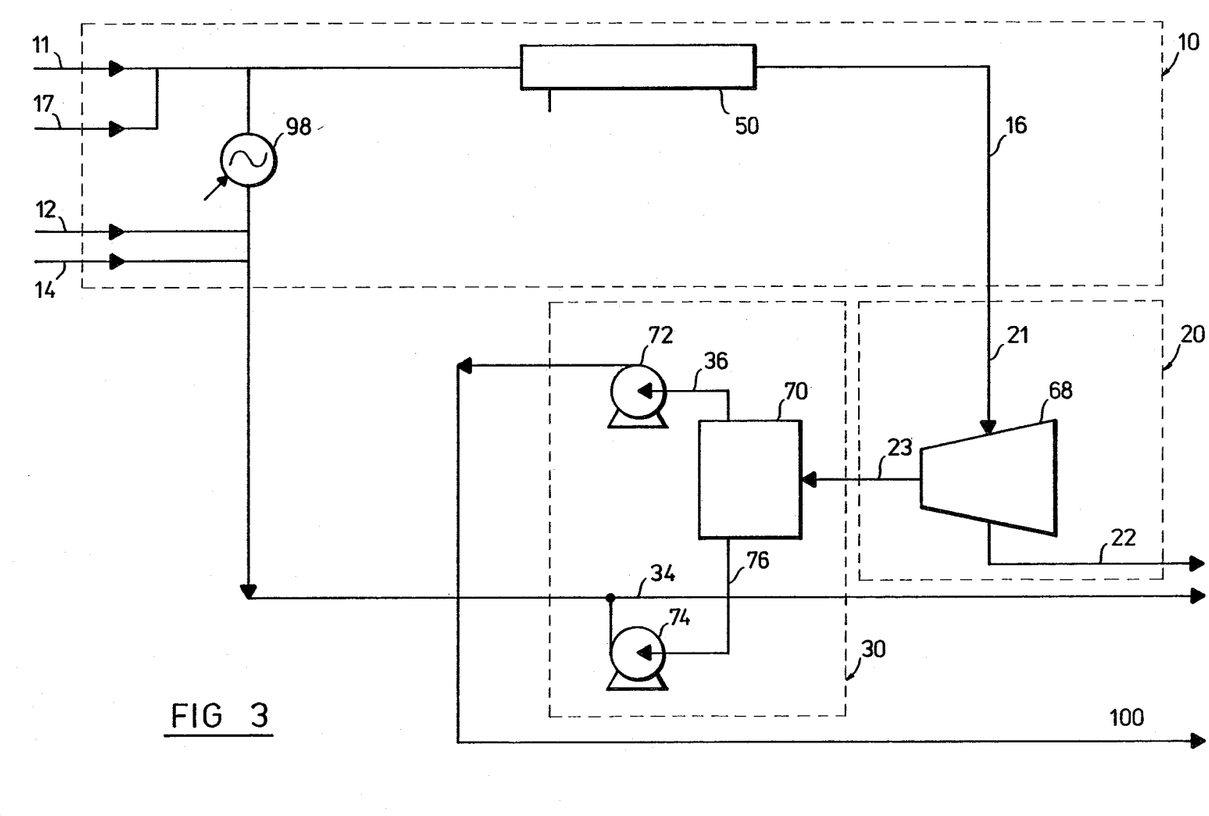
FIG. 3 is a similar diagrammatic illustration of an alternative process embodiment of the present invention.

FIG. 3 of the accompanying drawings diagrammatically illustrates a process according to the present invention in which hydrocarbon diluent addition to the sludge-conditioning zone is not required. In the process depicted in FIG. 3, there is provided a sludge-conditioning zone 10, a sludge treatment zone 20 and a phase separation zone 30, each depicted in broken outline, but there is no diluent recovery zone. Sludge enters the sludge-conditioning zone 10 via inlet line 11, and if required, hydrocarbon soluble conditioning agent is added thereto via line 17. Recycle water from upstream of the process enters zone 10 via line 15, and is mixed with water soluble conditioning agents supplied via lines 12 and 14. The temperature of the aqueous mixture is adjusted by passage through a heat exchanger 98 before it is mixed with the sludge in line 11. Then the sludge mixture enters the mixing device 50, from which conditioned sludge exits via line 16, to enter the centrfuge 68 in the sludge treatment zone 20, at 21. Two streams exit from the sludge treatment zone 20, i.e. the centrifuge 68, namely a solids-rich cake exiting via line 22 for disposal from the process, and a liquid-rich stream exiting via line 23 to the separation stage 30. In the separation stage, the liquid-rich stream enters the liquid/liquid separator device 70, where it is separated into an aqueous stream 76 and a hydrocarbon stream 36. The aqueous stream is pumped by means of pump 74 to line 34, where it is divided into an excess aqueous stream to exit from the process, and the aforementioned recycle stream 15 which returns to sludge-conditioning zone 10. The hydrocarbon stream 36 is pumped via pump 72 to an exit line 100, from which it returns to the sale tanks to be recombined with other useful hydrocarbons obtained from elsewhere in the processing, thereby increasing the overall hydrocarbon recovery from the production facility.

Figure 4:
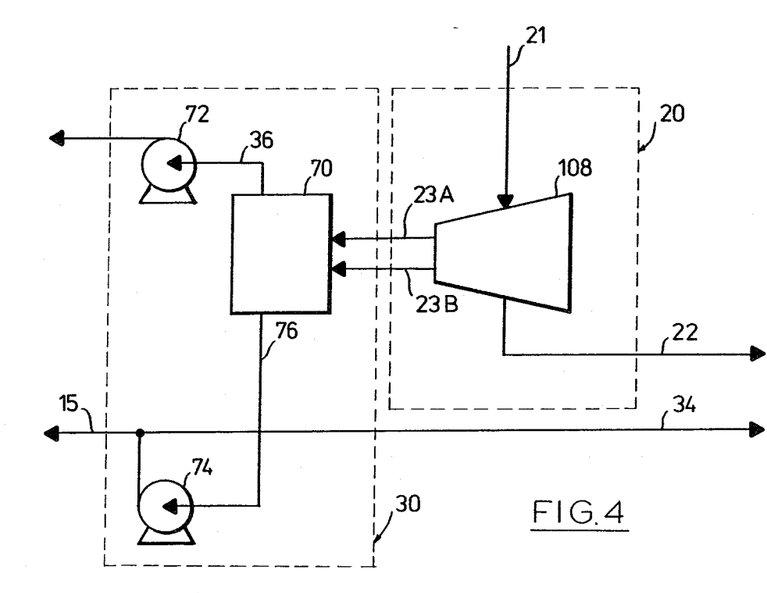
FIG. 4 is a diagrammatic illustration of a further process embodiment of the invention.

FIG. 4 of the accompanying drawings diagrammatically illustrates an alternative embodiment of a portion of a process according to the present invention, in which a three-way scroll-type centrifuge is used in replacement of the two-way centrifuge (e.g., the centrifuge 68 of FIGS. 2 and 3). FIG. 4 illustrates only the sludge treatment zone 20 and the phase separation zone 30 of the process of this embodiment. Sludge treatment zone 20 contains a three-way scroll-type centrifuge 108, to which is fed the conditioned sludge from the sludge-conditioning zone via line 21. There are three outlet streams from the centrifuge 108, a liquid hydrocarbon-rich stream exiting via line 23A to separator device 70, a liquid aqueous-rich stream exiting via line 23B to separator device 70, and a solid-rich cake 22, as before, containing most of the solids entering the sludge treatment zone 20 and being eliminated from the process for disposal. The majority of the hydrocarbon that enters the sludge treatment zone exits through line 23A, and the majority of the water entering the sludge treatment zone exits through line 23B. Each also contains a small amount of solids. In the liquid/liquid phase separation stage 30, there is provided as before the liquid/liquid separator device 70 and two liquid pumps 72, 74. The two streams 23A, 23B are fed to the separator 70 at different points. A hydrocarbon stream exits via line 36 under the influence of pump 72, to be fed to the hydrocarbon recovery sale tank to add to the overall hydrocarbon recovered from the process, or partially to be recycled as diluent to the sludge-conditioning zone (e.g. the zone 10 of FIGS. 1 and 2). The aqueous stream exits the separator 70 via line 76, under influence of pump 74, to be divided into excess aqueous stream in line 34 to leave the process, and into aqueous diluent for recycle to the sludge conditioning zone via line 15.

Thus the present invention provides a process for producing a treated sludge containing essentially no leachable hydrocarbon when processing oil-contaminated sludge similar in composition to those collected at heavy oil and oils and in situ projects, e.g. in Northern Alberta. The sludge is conditioned in the sludge-conditioning stage and then fed as conditioned sludge to a centrifuge for further separation, under controlled conditions. The oil recovered from the treatment of oil-contaminated sludge according to the invention can be pumped back to the oil production facility, thus improving the overall oil recovery efficiency.

Whilst specific preferred embodiments of the process according to the invention have been described in detail, with reference to the accompanying drawings, these are for illustrated purposes only, and are not to be considered as limiting. The scope of the present invention is limited only by the scope of the appended claims.

The invention will be further described, by way of illustration only, in the following example.

EXAMPLE

Four test samples of sludge were treated using the preferred method of the present invention as described above.

The test parameters and results are reported in Table 1. As can be seen in this table, most of the oil is recovered in and only a small amount of the solids are lost to the supernatant liquid.

TABLE 1

|  | Test No. | | | |
| --- | --- | --- | --- | --- |
|  | No. 1 | No. 2 | No. 3 | No. 4 |
| Raw Sludge Oil Content (14° API) (wt %) | 28.3 | 26.0 | 36.3 | 23.1 |
| Demulsifier type | RP329 | RP329 | RP329 + DS-504 | D-101 + DS-504 |
| Demulsifier dosage (ppm v/v on oil) | 100 | 109 | 88 | 88 |
| Conditioned sludge water content (wt %) | 40.6 | 46.1 | 60.2 | 35.2 |
| Centrifuge gravitational force (x g) | 2092 | 2720 | 2690 | 3065 |
| Solids Residence Time (sec) | 8.6 | 3.9 | 4.8 | 11.1 |
| Solids Recovery in the Cake (%) | 95.0 | 98.2 | 99.9 | 97.5 |
| Oil Recovery in the Supernatant Liquid (%) | 94.9 | 95.6 | 96.0 | 95.0 |

The embodiments of the invention in which an exclusive property or privilege is claimed are defined as follows:

1. A process for treating an oil-containing sludge for recovery of oil-free solids therefrom, said sludge comprising an emulsion having a continuous liquid phase and a dispersed liquid phase, of mutually immiscible liquids, one of said liquids being an aqueous liquid freely miscible with water and the other of said liquids being a hydrocarbon oil, either or both of said liquids containing dispersed inorganic solids, said process comprising the steps of:
  (a) in a first, sludge-conditioning stage, preparing a conditioned sludge ready for centrifugation, said conditioned sludge being characterized by a solids content of less than 50% by weight, of wataer content of less than 90% by weight, an oil phase with an API gravity of less than 12°, a continuous aqueous phase, and the solids in the sludge being primarily water-wetted, said preparation being accomplished by addition of the appropriate amount of water, hydrocarbon diluent and conditioning agent to attain said characterization based on the results of predetermination of the characteristics of said oil-containing sludge prior to conditioning, and adjusting the temperature of the conditioned sludge to a temperature slightly below the boiling point of the lowest boiling constituent thereof;

(b) in a second sludge treatment stage, subjecting the conditioned sludge to centrifugation, to separate therefrom a solids-rich material of low hydrocarbon content and an aqueous supernatant liquid of higher hydrocarbon content; and (c) in a liquid/liquid separation stage, causing the supernatant liquid to separate into an aqueous phase and a hydrocarbon phase.

2. The process of claim 1 including the step of:

(e) recycling a part of at least one of the aqueous and hydrocarbon phases to the sludge-conditioning stage.

3. The process of claim 1 wherein said at least one conditioning agent is active predominantly to modify the continuous liquid phase of the sludge as opposed to the dispersed phase thereof.

4. The process of claim 2 wherein the oil present in the sludge has an API gravity of 14° or less, and liquid hydrocarbon is added to the sludge conditioning stage as a diluent for the sludge.

5. The process of claim 4 wherein said liquid hydrocarbon diluent has an API gravity of 17.5° or more.

6. The process of claim 5 wherein the conditioned sludge is further characterized in that the diluted hydrocarbon phase has a specific gravity of 0.95 or less, said specific gravity being attained by addition of the appropriate amount of liquid hydrocarbon thereto and the appropriate temperature adjustment thereof.

7. The process of claim 4 wherein said part of the hydrocarbon phase which is recycled to the sludge-conditioning stage is a lower boiling compound obtained from said hydrocarbon phase distillation, or by flash evaporation, to form at least part of said liquid hydrocarbon diluent.

8. The process of claim 4 wherein a hydrocarbon soluble conditioning agent is added to the sludge-conditioning stage.

9. The process of claim 8 wherein the hydrocarbon soluble conditioning agent is a demulsifier.

10. The process of claim 4 wherein the continuous phase of the sludge to be treated is the aqueous phase.

11. The process of claim 3 wherein the continuous phase of the sludge to be treated is the hydrocarbon oil phase, and water is added to the sludge-conditioning stage as conditioning agent and is active predominantly to modify the dispersed aqueous phase of the sludge.

12. The process of claim 11 wherein the water so-added is, at least in part, a recycle stream from the liquid/liquid separation stage.

13. The process of claim 12 wherein the water is added to ensure that conditioned sludge containing not more than 90% water and not more than 50% total solids content enters the second stage.

14. The process of claim 13 wherein at least one water soluble conditioning agent is also added to the sludge-conditioning stage.

15. The process of claim 14 wherein one of said water soluble conditioning agents is a solids-wetting agent.

16. The process of claim 14 wherein one of said water soluble conditioning agents is a modifier of pH.

17. The process of claim 1 wherein the sludge to be conditioned has more than about 40% of its solids content present in the hydrocarbon oil phase, and wherein in the conditioning stage, all of the required oil soluble conditioning agents are first added and all of the required water and water soluble conditioning agents are subsequently added to the sludge-conditioning stage.

18. The process of claim 1 wherein centrifugation in the second stage is effected with a solid-bowl, scroll-type centrifuge, two-way machine.

19. The process of claim 18 in which the solid-bowl, scroll-type centrifuge is a three-way machine having separate liquid outlets for a first liquid consisting mainly of hydrocarbon oil with some solids and water and a second liquid consisting mainly of aqueous phase with some solids and hydrocarbon oil.

20. The process of claim 19 wherein said two liquid streams are introduced at separate points into the third, liquid/liquid separation stage.

21. The process of claims 18, 19 or 20 wherein the conditioned sludge is introduced into the centrifuge at a feed point in the half part of the machine distant from the solids discharge.

22. The process of claim 21 wherein the conditioned sludge is introduced into the centrifuge at a feed point in the quarter part of the machine most distant from the solids discharge.

23. The process of claim 22 wherein the residence time is between 0.5 and 15 seconds and the centrifugal force is between 2,000 to 3,500 times the gravitational force.

24. The process of claim 23 wherein the residence time is between 3 and 5 seconds and the centrifugal is between 2,500 to 2,700 times the gravitational force.

* * * * *